June 18, 1929.    J. R. WEAVER    1,717,426
INSPECTING APPARATUS FOR METER PAPER
Filed Dec. 6, 1927    3 Sheets-Sheet 1

INVENTOR
James R. Weaver.
BY
ATTORNEY

June 18, 1929.   J. R. WEAVER   1,717,426
INSPECTING APPARATUS FOR METER PAPER
Filed Dec. 6, 1927   3 Sheets-Sheet 2

INVENTOR
James R. Weaver.
BY
ATTORNEY

June 18, 1929.                J. R. WEAVER                1,717,426
                    INSPECTING APPARATUS FOR METER PAPER
                    Filed Dec. 6, 1927         3 Sheets-Sheet 3

INVENTOR
James R. Weaver.
BY
            ATTORNEY

Patented June 18, 1929.

1,717,426

UNITED STATES PATENT OFFICE.

JAMES R. WEAVER, OF IRWIN, PENNSYLVANIA, ASSIGNOR TO WESTINGHOUSE ELECTRIC & MANUFACTURING COMPANY, A CORPORATION OF PENNSYLVANIA.

INSPECTING APPARATUS FOR METER PAPER.

Application filed December 6, 1927. Serial No. 238,106.

My invention relates generally to punching machines and more particularly to testing devices provided in conjunction with punching machines.

While the invention is applicable to a wide variety of uses, it is particularly useful in connection with machines of the type that are employed in preparing paper for use in electric meters. Such paper must be of uniform width and must be provided with marginal holes for engaging the driving sprockets in the meters. The marginal holes must be accurately spaced both laterally and longitudinally of the paper, in order that the sheet may be drawn through the meters at the proper speed. Any inaccuracy in the spacing or location of the holes in the meter paper will prevent the proper functioning of the meters, since the meters by the failure of the holes to register with the teeth of the meter sprocket wheels will not engage the paper properly. Meters intended for utilizing recording sheets are often operated in positions where it is not feasible to keep them under observation, and in fact, they may be operated many days at a time without being inspected. It will, therefore, be understood that defects in the recording paper will cause a failure of the record, and, therefore, a loss to the power distributor.

The object of the invention, generally stated, is the provision of punching machines provided with testing devices, that shall be simple and efficient in operation and capable of being readily and economically manufactured.

A more specific object of the invention is to provide for testing the lateral and longitudinal spacing of holes punched in paper or other material.

Another object of the invention is to provide for automatically stopping the operation of a punching machine when the holes punched by it are not accurately located in the punched material.

It is also an object of the invention to prevent the incorrect punching of holes in paper or other material by punching machines to prevent the loss that may be occasioned by damaged material.

Other objects of the invention will, in part, be obvious and will, in part, appear hereinafter.

The invention, as disclosed in the accompanying drawings, comprises the structural features and the combination of elements and arrangement of parts which will be hereinafter set forth and the scope of the application of which will be particularly defined in the claims.

For a fuller understanding of the invention, reference may be had to the following detail description, taken in connection with the accompanying drawings, in which:

Figure 1 is a view, in side elevation, of a portion of a machine for perforating meter paper that is provided with a testing device embodying my invention, Fig. 2 is a top plan view of a section of paper that has been punched and tested by the machine illustrated in Fig. 1.

Figure 3:
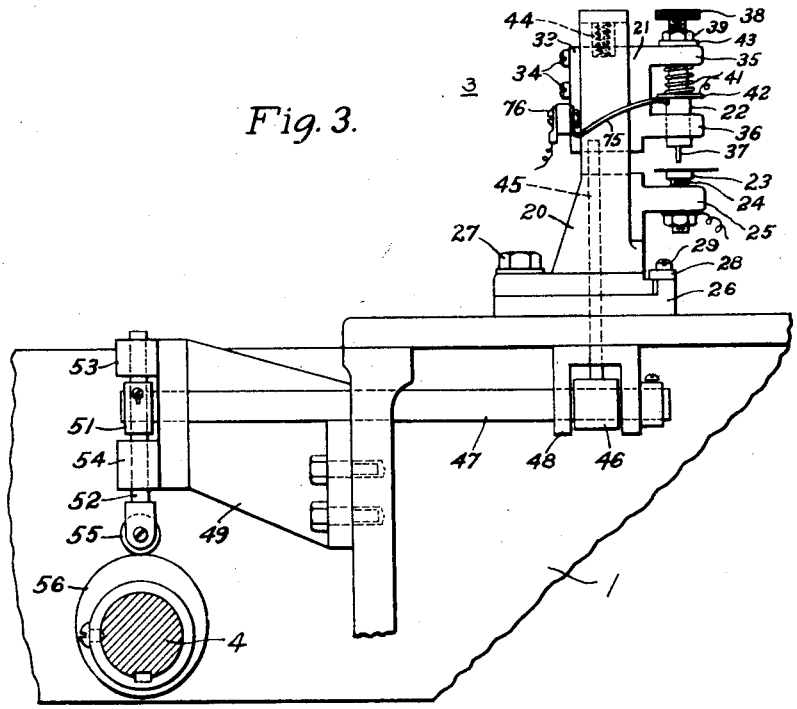
Fig. 3 is an enlarged view in section, taken on the line III—III of Fig. 1 with the plunger of the testing device in a raised position.
Figure 4:
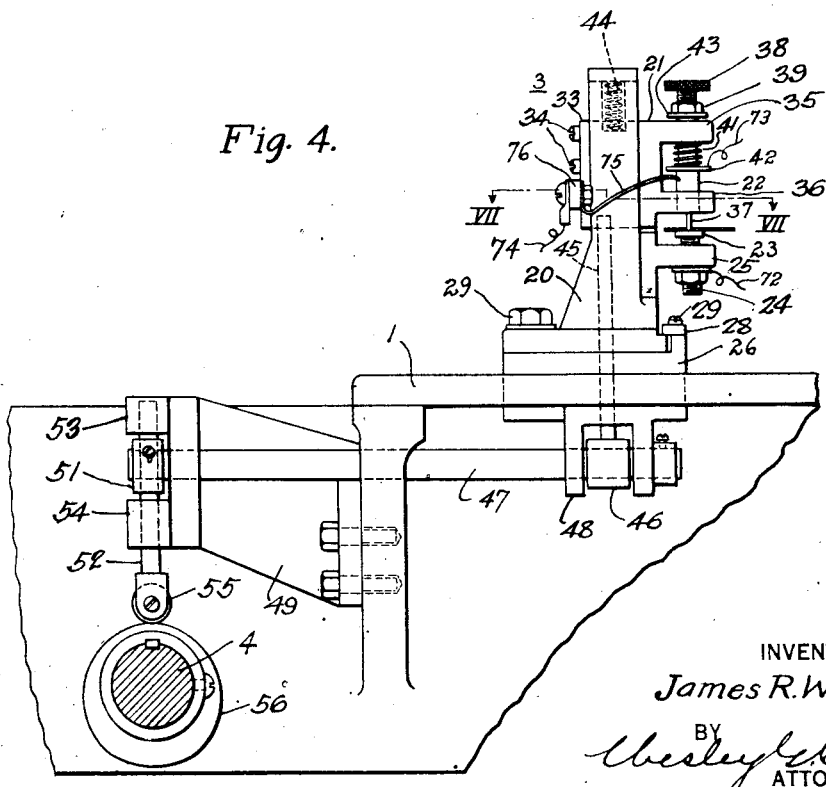
Figure 5:
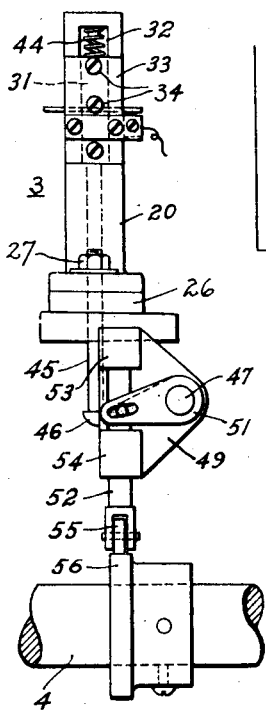
Figure 8:
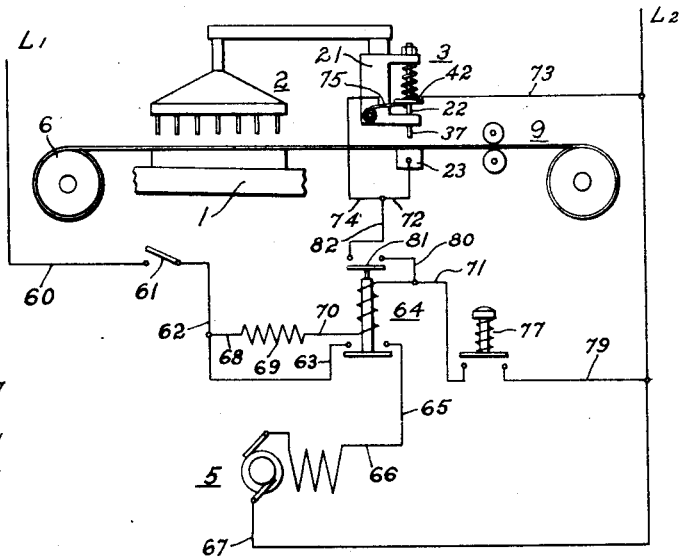
Figure 6:
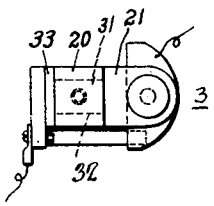
Figure 7:
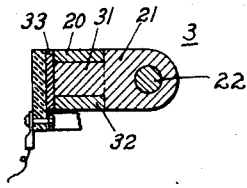

Fig. 4 is a view similar to Fig. 3, but showing the plunger of the testing device in its lowermost position, Fig. 5 is an enlarged view, in rear elevation, of the testing device shown in Fig. 1, Fig. 6 is a top plan view of the testing device, Fig. 7 is a view in section, taken on the line VII—VII of Fig. 4, and Fig. 8 is a digrammatic view of the electrical control system of the machine shown in Fig. 1.

As illustrated in the drawings, the machine comprises a frame 1, upon which is mounted a punching device 2, a testing device 3, a drive shaft 4, for operating the punching and testing devices, and a motor 5 for operating the drive shaft. A stock roll 6 of meter paper is mounted upon a supporting bracket 7, at one end of the machine frame with the free end of the paper passing through a series of tensioning rolls 8, through the punching device 2 and then through the testing device 3.

A pair of frictional rolls 9 for advancing the paper through the machine are disposed upon the frame 1 beyond the testing device 3 in a position to engage the paper and pull it through the machine. The frictional rolls 9 are driven by the drive shaft 4 through a gear train 10, and a ratchet clutch 11. The clutch 11 is interposed between the gear train and the frictional rolls, for the purpose of moving the paper through the punching device 2, and the testing device 3, in a step-by-step manner. Inasmuch as the provision of frictional rolls for performing the function of the present rolls 9 is old and well known in the art, a further detailed description thereof will not be given.

The punching device 2 comprises a die plate 13 that is disposed underneath the paper, a punch plunger 14 which is disposed above the paper in a position to cooperate with the die plate in the punching operations, and a guiding block for the punches 15. In order that the paper may be punched as rapidly as possible, the punch plunger 14 is provided with a plurality of the punches 15 by means of which a large number of holes may be made at each operation.

The punch plunger 14 is operated by a lever 16 which is connected, through a pitman 17, to an eccentric 18 that is disposed on the drive shaft 4. It will therefore be seen that each rotation of the drive shaft 4 will move the punch plunger 14 downward to punch a group of holes in the paper.

The testing device 3 comprises a supporting body 20, a movable block 21 that is mounted in the upper portion of the supporting body, a cylindrical plunger 22 that is carried by the movable block 21, and an anvil 23 that is disposed on a set screw 24 which is mounted in a bracket 25 on the supporting body.

The supporting body 20 is mounted on a base 26 which is disposed on the frame 1. In order that the body 20 may be adjusted on the base 26 to suit the conditions under which the testing device operates, it is secured thereto by a bolt 27 and a clamping clip 28 that is held in place by a screw 29.

The movable block 21 is provided with a narrow section 31 which is adapted to be slidably mounted in a rectangular slot 32 in the upper portion of the supporting body 20 in such a manner that the block may be moved along vertical lines. A plate 33 is attached to the end of the narrow section 31 by screws 34 to keep the block in position in the slot.

The plunger 22 is slidably disposed in a pair of extended portions 35 and 36 of the movable block 21, and is provided with a contact point 37 for engaging the anvil 23. In order that the contact point 37 may be removed for repairs or replacement, it is mounted in the hollow center of the plunger 22 by means of a screw 38 and a lock nut 39. It will therefore be understood that contact points of different sizes may be employed to suit the size of the holes in the paper.

For the purpose of forcing the plunger 22 and its contact point 37 toward the anvil 23, a spring 41 is coiled around the upper central portion of the plunger with one end resting against the upper extended portion 35 of the block 21 and the opposite end resting against the upper side of a transverse plate 42 that is mounted on the central portion of the plunger.

A collar 43 on the upper part of the plunger limits its downward movement. The means for moving the block 21 along vertical lines in the supporting body 20 comprises a coiled spring 44 for forcing the block downwardly and a push rod 45 for moving it upwardly against the action of the spring 44.

As shown, the spring 44 is disposed in the upper end of the slot 32 in the supporting body 20 with its upper end supported by a wall above the slot and its lower end bearing on the movable block 21 so that it exerts a downward pressure on the block at all times.

The push rod 45 is disposed in a vertical position in the lower part of the supporting body 20 with its upper end engaging the block 21 and its lower end bearing on the free end of an actuating arm 46. The actuating arm 46 is secured to, and may be operated by a transverse shaft 47 that is supported by brackets 48 and 49 that are mounted on the frame 1. The transverse shaft 47 may be rotated by a second arm 51 that is mounted thereon near one end. The outer end of the second arm 51 is pivotally secured to a vertical rod 52 that is mounted in a pair of bearings 53 and 54 in the bracket 49. In order to actuate the vertical rod 52 to rotate the transverse shaft 47 through the second arm 51, its lower end is provided with a roller 55 that engages an eccentric collar 56 that is disposed on the drive shaft 4. It will therefore be seen that rotation of the drive shaft 4, will, through the action of the eccentric 56, cause the block 21 to be moved upwardly in the supporting body 20 and that the spring 44 will cause it to be moved downwardly, thereby effecting a reciprocating movement of the block.

Inasmuch as the plunger 22 is slidably mounted in the movable block 21 and is normally held in its lowermost position therein, a downward movement of the movable block 21 will carry the plunger 22 down with it until its contact point 37 strikes the anvil 23. The plunger 22 upon striking the anvil 23 will be held stationary while the block 21 completes its downward movement.

The testing device 3 is disposed on the frame 1 and located relative to the punching device 2 so that if the paper is properly perforated when it passes over the anvil 23, it will permit the contact point 37 on the plunger 22 to engage the anvil through one of the holes 57 in the paper.

As shown in Fig. 8, the testing device 3 is electrically connected in the motor circuit in such a manner as to constitute a switch for controlling the motor 5. The motor 5 may be operated from any suitable source of power and in this instance, a power line comprising the line conductors $L^1$ and $L^2$ is shown and the motor circuit extends from supply line L¹, through conductor 60, line switch 61, conductors 62 and 63, the contact members of a relay 64, conductors 65 and 66, the motor 5, and conductor 67 to supply line L².

The testing device 3 is disposed to control the line relay 64. As shown, the testing device presents a plurality of circuit paths which may be closed alternately to control the actuating circuit of the relay 64 to govern the operation of the motor.

In order to start the motor, a push-button switch 77 is provided for closing the actuating circuit for the relay 64. Therefore, when the push-button-switch is pressed, a circuit is established which extends from the conductor 62 through conductor 68, a resistor 69, conductor 70, the actuating coil of the relay 64 and conductor 71, push-button switch 77, conductor 79 to the line conductor L² and the relay is closed. When the relay is closed, a holding circuit is established which may be traced from the energized actuating coil of the relay through conductor 80, interlock 81, conductor 82, and one of the current paths through the testing device. In the present illustration, the current path through the testing device comprises a spring 75 and plate 42 to a conductor 73. When the block 21 is actuated to its lowermost position the current path through the testing machine extends from the conductor 82, a conductor 72, anvil 23, plunger 22, and contact plate 42 to the conductor 73.

The spring 75 is mounted on an insulating body 76 on the movable block 21 and is disposed in such manner that its free end will engage the underside of the plate 42 on the plunger 22 while the movable block 21 is in its upper position (as shown in Fig. 3), but will be out of engagement with the plate 42 when the block 21 reaches its lowermost position (as shown in Fig. 4). The spring 75 will remain in engagement with the plate 42 until after the plunger 22 strikes the anvil 23.

It will therefore be understood that the circuit through the spring 75 will be closed and that the circuit through the anvil 23 will be open when the block 21 and plunger 22 are in their uppermost positions. When the block 21 is moved to its central position and the contact point 37 engages the anvil 23, both of the current paths through the testing device will be closed and will be in parallel. When the block 21 is moved to its lowermost position, the circuit through the spring 75 is opened and the circuit through the anvil 23 is closed, providing the holes 57 in the paper are accurately spaced and register with the contact point 37.

The operation of the machine is as follows. Assuming that a roll of stock paper 6 has been placed in the machine and that the machine is ready for operation, then the line switch 61 is closed and the motor 5 started. When the punching operations are inaccurate and a portion of the paper passing through the testing device and between the anvil and its cooperating plunger has not been perforated by the punching device 2, the plunger contact point 37 strikes the paper 6 instead of the anvil 23 when the block 21 moves to its lowermost position. In such manner, the holding circuit for the relay 64 is interrupted and the motor stopped. After the paper in the testing machine has been properly adjusted, the motor may be started again by actuating the push-bottom switch 77.

The motor 5 when operating, rotates the drive shaft 4 and actuates the punching device 2, the testing device 3 and the frictional rolls 9 to pull the paper in through the machine. As soon as the paper has been punched and has traveled to the testing device 3, the plunger contact point 37 will engage the anvil 23 through the punched holes 57 and maintain a circuit through the testing device which holds the relay switch 64 closed. The holding circuit established when the plunger is in its lowermost position extends from conductor 62, through conductor 68, resistor 69, conductor 70, the coil of relay 64, conductor 72, the anvil 23 and the plunger 22 to the plate 42 and conductor 73 to the line conductor L².

In order to make the inspecting device effective in checking the location of the holes in the paper, it is necessary to furnish a standard for comparison. The standard is provided by placing the inspecting device 3 at a distance from the punching device 2 that is equal to the distance or to some multiple of the distance between the centers of the holes 57. It is also preferable to employ a multiple of the distance for the reason that the errors are thereby multiplied, thus giving the testing device a greater degree of accuracy. When the inspecting device is properly disposed with reference to the paper and at a distance from the punch that is some multiple of the distance between the centers of the holes, the plunger contact point 37 will engage the anvil 23 through the holes 57 in the paper as long as the paper is being accurately punched and passed through the machine. However, if the paper is not pulled forward properly at any instant or the holes punched therein are inaccurately spaced, the holes will not register with the plunger contact point and it will be prevented from engaging the anvil on its downward movement by reason of the fact that it strikes the paper instead of entering one of the holes. Under such conditions, the circuit through the inspecting device is broken, thereby deenergizing the relay and stopping the motor.

When the machine is stopped by the passage of inaccurately punched paper through the inspecting device, the operator either cuts out the defective portion of paper, or marks it off so that it may be eliminated when the paper is being rewound.

It will also be noted that the testing device stops the machine upon the first appearance of defective punching and thereby prevents any further loss which might be occasioned by inaccurately punched paper.

While the illustrated example constitutes a particular embodiment of my invention, I do not limit myself strictly to the details shown, since manifestly the same may be varied considerably without departing from the spirit of the invention as defined in the appended claims.

I claim as my invention:

1. In a punching machine, the combination with means for punching holes in predetermined positions in a material, of means responsive to inaccuracies in the punching of the holes for interrupting the operation of the punching means.

2. In a machine for perforating a fabric having insulating properties, means for making perforations in predetermined positions in the fabric, electrical means for controlling the operation of the perforating means, and means actuated in conjunction with the perforating means responsive to the relative posions of the perforations for actuating the electrical control means.

3. In a machine for perforating a fabric having insulating properties, means for punching holes in predetermined positions in the fabric, and electrical means responsive to inaccuracies in the punching of the holes to interrupt the operation of the punching means.

4. In a machine, means for performing work operations, a control circuit for governing the operation of the work-performing means, and a switch for controlling the circuit, said switch comprising cooperative contacting members disposed to be actuated in sequence to maintain the control circuit, the circuit being maintained for intervals through the contact members in pairs, whereby the interruption of the functioning of one pair will interrupt the control circuit.

5. In a machine for punching holes in a fabric, means for testing the accuracy of the holes punched in the fabric comprising a control circuit and switching means connected in the control circuit provided with a plurality of contact members connected in parallel and disposed to be closed in a predetermined sequence when the machine operates accurately to maintain the control circuit closed, one of said contact members being disposed to contact through openings in the fabric whereby its functioning may be interrupted by the inaccuracy in the punching of the holes thereby to interrupt the control circuit.

6. In a machine for punching holes in a fabric, in combination, means for punching the holes, a motor for actuating the punching means, a control circuit for the motor, and a switch actuated in conjunction with the punching means for controlling the circuit, said switch being provided with a plurality of contacting members disposed to be closed in a predetermined sequence, and one of said contacting members being disposed to be projected through the holes in the fabric, whereby the control circuit may be interrupted upon the misplacing of the holes.

7. In a machine for punching holes in a fabric, having insulating characteristics, in combination, means for punching the holes, a motor for actuating the punching means, a control circuit for the motor, and a switch actuated in conjunction with the punching means for controlling the circuit, said switch having a pair of contact members disposed at such a distance from the punching means as to make contact through one of the holes in the fabric when the paper is being punched accurately.

8. In a machine for punching holes in a fabric, having insulating characteristics, in combination, means for punching the holes, a motor for actuating the punching means, a control circuit for the motor, and a switch actuated in conjunction with the punching means for controlling the circuit, said switch being provided with a plurality of contact members disposed to be closed in a predetermined sequence, and one of said contact members being disposed to be projected through a hole in the fabric when it is at a distance from the punching means equal to a multiple of the distance between the centers of a pair of correctly placed holes, whereby the control circuit may be interrupted upon the misplacing of the holes.

9. In a machine for punching holes in a fabric having insulating characteristics, in combination, means for punching the holes, a motor for actuating the punching means, a control circuit for the motor, and a switch actuated in conjunction with the punching means for controlling the circuit, said switch being provided with a plurality of contact-members and one of said contact-members being disposed to pass through an opening in the fabric to establish a circuit, said opening being at a distance from the punching means that is equal to some multiple of the distance between the centers of adjacent accurately placed holes, whereby its functioning may be interrupted by inaccuracy in the punching of the holes.

10. In a machine for punching holes in a fabric having insulating characteristics, in combination, means for punching the holes, a motor for actuating the punching means, a control circuit for the motor, and a switch actuated in conjunction with the punching means for controlling the circuit, said switch being provided with a plurality of contact members, means for closing one pair of the contact members, means for closing the second pair of contact members while the first named pair of contact members are closed, and means for opening said first named pair of contacting members after the second named pair of contacting members are closed.

11. In a machine for punching holes in a fabric having insulating characteristics, in combination, means for punching the holes, a motor for actuating the punching means, a control circuit for the motor, and a switch actuated in conjunction with the punching means for controlling the circuit, said switch being provided with a plurality of contact members, means for closing one pair of contact members, means for closing the second pair of contact members through one of the holes in the fabric when the holes are accurately placed while the first named pair of contact members is closed, and means for opening said first named pair of contact members after the second named pair of contact members is closed.

In testimony whereof, I have hereunto subscribed my name this 3rd day of December, 1927.

JAMES R. WEAVER.